US012625750B2

(12) United States Patent
Wang et al.

(10) Patent No.: US 12,625,750 B2
(45) Date of Patent: May 12, 2026

(54) AUTOMATIC STATE MIGRATION OF STATEFUL CONTAINER DURING SECONDARY APPLICATION CONTAINER HOT UPGRADE

(71) Applicant: International Business Machines Corporation, Armonk, NY (US)

(72) Inventors: Yue Wang, Beijing (CN); Xinpeng Liu, Austin, TX (US); Wei Wu, Beijing (CN); Liang Wang, Beijing (CN); Biao Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 18/451,254

(22) Filed: Aug. 17, 2023

(65) Prior Publication Data

US 2025/0061009 A1 Feb. 20, 2025

(51) Int. Cl.
*G06F 9/54* (2006.01)

(52) U.S. Cl.
CPC ................................... *G06F 9/542* (2013.01)

(58) Field of Classification Search
CPC . H04W 76/15; H04W 72/1273; H04W 72/25; H04W 40/12; H04W 40/22; H04W 88/04; H04W 76/14
See application file for complete search history.

(56) References Cited

U.S. PATENT DOCUMENTS 11,792,301 B1 * 10/2023 Du ...................... H04L 67/1001
709/226
2022/0206782 A1 * 6/2022 Guo ........................... G06F 8/71
(Continued)

FOREIGN PATENT DOCUMENTS

CN 111552496 B 7/2021
CN 113296805 A 8/2021
(Continued)

OTHER PUBLICATIONS

"Introduction—OpenKruise," OpenKruise, copyright 2023, last updated on Apr. 3, 2023 by berg, accessed Aug. 1, 2023, 3 pages. https://openkruise.io/docs/.

(Continued)

*Primary Examiner* — Sisley N Kim

(74) *Attorney, Agent, or Firm* — Yee & Associates, P.C.

(57) ABSTRACT

Secondary application container hot upgrade is provided. It is determined whether an upgraded secondary application container is ready to run in a pod that includes a secondary application container, a router container, and a primary application container based on monitoring a status of the upgraded secondary application container. The router container is directed to send a subsequent external service request to the upgraded secondary application container to manage for the primary application container in response to determining that the upgraded secondary application container is ready to run. The secondary application container is deleted from the pod that includes the upgraded secondary application container in response to directing the router container to send the subsequent external service request to the upgraded secondary application container to manage for the primary application container. The router container is deleted from the pod in response to deleting the secondary application container from the pod.

20 Claims, 6 Drawing Sheets

(56) References Cited

U.S. PATENT DOCUMENTS

2024/0250918 A1 * 7/2024 Zhang ................. H04L 41/0894
2024/0330031 A1 * 10/2024 Eberlein ................. G06F 21/55

FOREIGN PATENT DOCUMENTS

CN        113422700 A    9/2021
CN        114942797 A    8/2022

OTHER PUBLICATIONS

"SidecarSet," OpenKruise, copyright 2023, last updated on Jul. 4, 2023 by Yuedong Wu, accessed Aug. 1, 2023, 18 pages. https://openkruise.io/docs/user-manuals/sidecarset/.
"Update Your App," Kubernetes, last modified May 5, 2023, accessed Aug. 1, 2023, 3 pages. https://kubernetes.io/docs/tutorials/kubernetes-basics/update/update-intro/.
Nemade, "Exploring Upgrade Strategies for Stateful Sets in Kubernetes," Velotio, copyright 2023, accessed Aug. 1, 2023, 12 pages. https://www.velotio.com/engineering-blog/exploring-upgrade-strategies-for-stateful-sets-in-kubernetes.

* cited by examiner

COMPUTING ENVIRONMENT
100

FIG. 4A

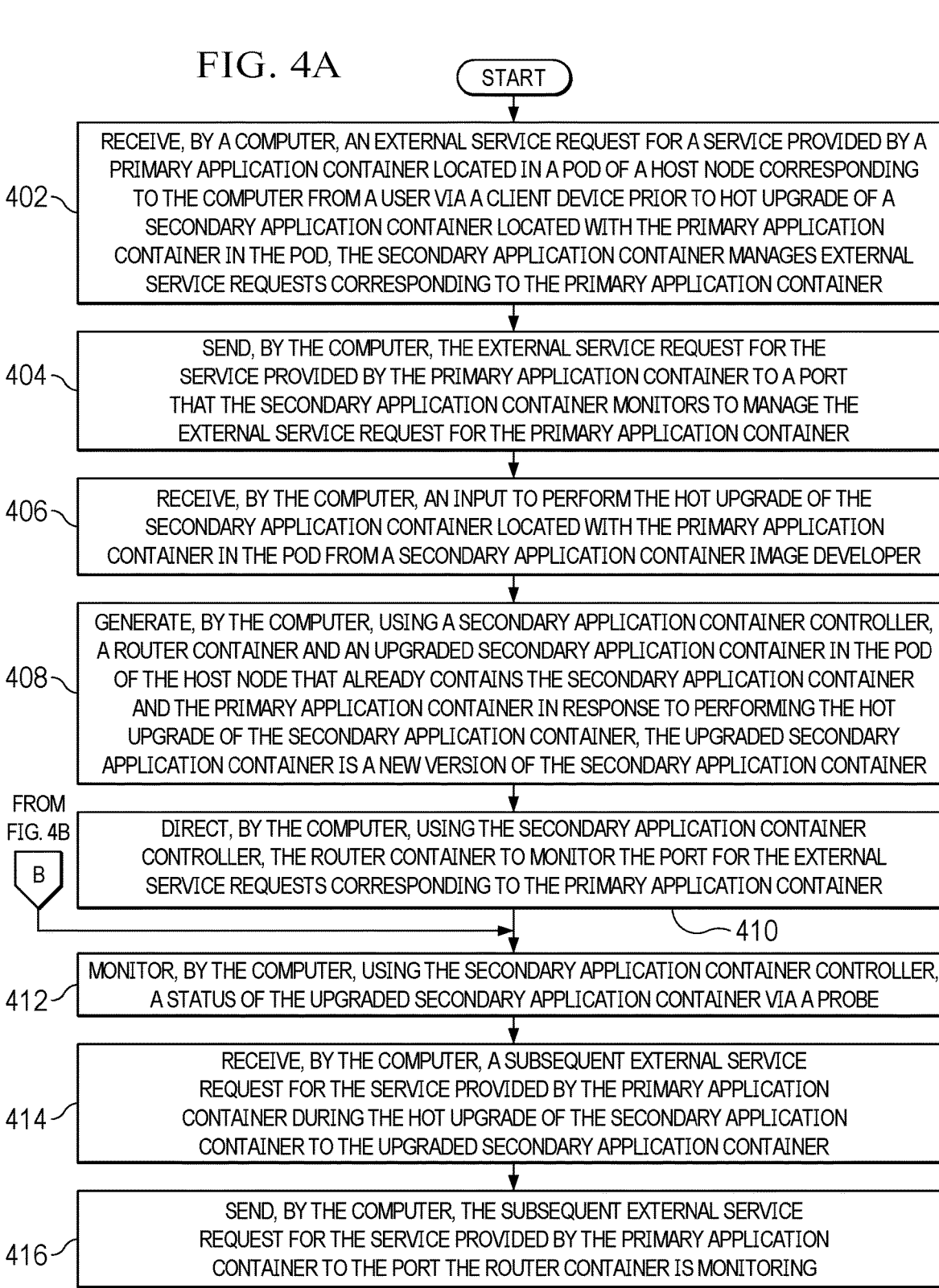

START

402 — RECEIVE, BY A COMPUTER, AN EXTERNAL SERVICE REQUEST FOR A SERVICE PROVIDED BY A PRIMARY APPLICATION CONTAINER LOCATED IN A POD OF A HOST NODE CORRESPONDING TO THE COMPUTER FROM A USER VIA A CLIENT DEVICE PRIOR TO HOT UPGRADE OF A SECONDARY APPLICATION CONTAINER LOCATED WITH THE PRIMARY APPLICATION CONTAINER IN THE POD, THE SECONDARY APPLICATION CONTAINER MANAGES EXTERNAL SERVICE REQUESTS CORRESPONDING TO THE PRIMARY APPLICATION CONTAINER

404 — SEND, BY THE COMPUTER, THE EXTERNAL SERVICE REQUEST FOR THE SERVICE PROVIDED BY THE PRIMARY APPLICATION CONTAINER TO A PORT THAT THE SECONDARY APPLICATION CONTAINER MONITORS TO MANAGE THE EXTERNAL SERVICE REQUEST FOR THE PRIMARY APPLICATION CONTAINER

406 — RECEIVE, BY THE COMPUTER, AN INPUT TO PERFORM THE HOT UPGRADE OF THE SECONDARY APPLICATION CONTAINER LOCATED WITH THE PRIMARY APPLICATION CONTAINER IN THE POD FROM A SECONDARY APPLICATION CONTAINER IMAGE DEVELOPER

408 — GENERATE, BY THE COMPUTER, USING A SECONDARY APPLICATION CONTAINER CONTROLLER, A ROUTER CONTAINER AND AN UPGRADED SECONDARY APPLICATION CONTAINER IN THE POD OF THE HOST NODE THAT ALREADY CONTAINS THE SECONDARY APPLICATION CONTAINER AND THE PRIMARY APPLICATION CONTAINER IN RESPONSE TO PERFORMING THE HOT UPGRADE OF THE SECONDARY APPLICATION CONTAINER, THE UPGRADED SECONDARY APPLICATION CONTAINER IS A NEW VERSION OF THE SECONDARY APPLICATION CONTAINER

FROM FIG. 4B

B

DIRECT, BY THE COMPUTER, USING THE SECONDARY APPLICATION CONTAINER CONTROLLER, THE ROUTER CONTAINER TO MONITOR THE PORT FOR THE EXTERNAL SERVICE REQUESTS CORRESPONDING TO THE PRIMARY APPLICATION CONTAINER

— 410

412 — MONITOR, BY THE COMPUTER, USING THE SECONDARY APPLICATION CONTAINER CONTROLLER, A STATUS OF THE UPGRADED SECONDARY APPLICATION CONTAINER VIA A PROBE

414 — RECEIVE, BY THE COMPUTER, A SUBSEQUENT EXTERNAL SERVICE REQUEST FOR THE SERVICE PROVIDED BY THE PRIMARY APPLICATION CONTAINER DURING THE HOT UPGRADE OF THE SECONDARY APPLICATION CONTAINER TO THE UPGRADED SECONDARY APPLICATION CONTAINER

416 — SEND, BY THE COMPUTER, THE SUBSEQUENT EXTERNAL SERVICE REQUEST FOR THE SERVICE PROVIDED BY THE PRIMARY APPLICATION CONTAINER TO THE PORT THE ROUTER CONTAINER IS MONITORING

A  TO FIG. 4B

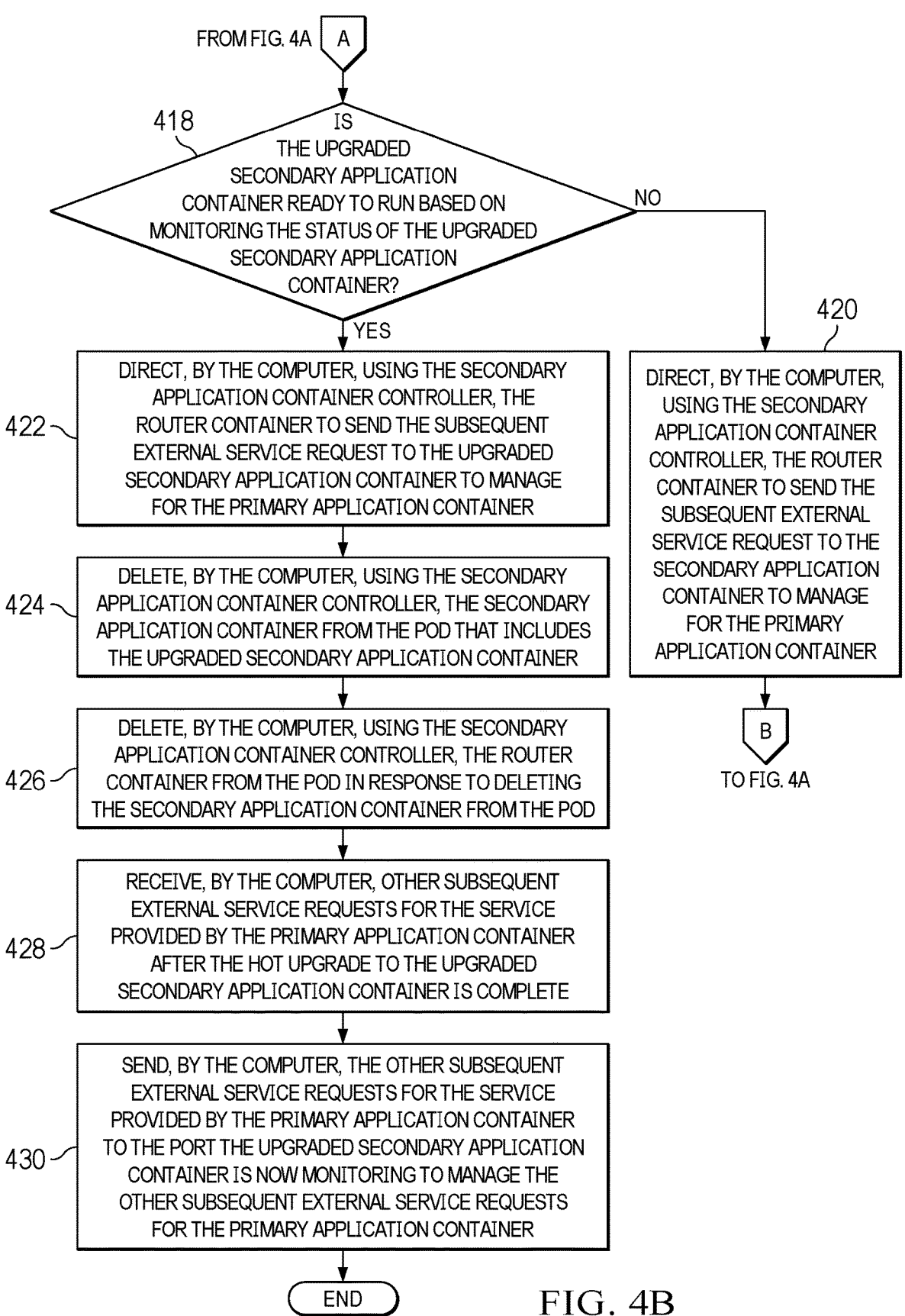

FROM FIG. 4A  A

418

IS THE UPGRADED SECONDARY APPLICATION CONTAINER READY TO RUN BASED ON MONITORING THE STATUS OF THE UPGRADED SECONDARY APPLICATION CONTAINER?

NO

YES

422 — DIRECT, BY THE COMPUTER, USING THE SECONDARY APPLICATION CONTAINER CONTROLLER, THE ROUTER CONTAINER TO SEND THE SUBSEQUENT EXTERNAL SERVICE REQUEST TO THE UPGRADED SECONDARY APPLICATION CONTAINER TO MANAGE FOR THE PRIMARY APPLICATION CONTAINER

424 — DELETE, BY THE COMPUTER, USING THE SECONDARY APPLICATION CONTAINER CONTROLLER, THE SECONDARY APPLICATION CONTAINER FROM THE POD THAT INCLUDES THE UPGRADED SECONDARY APPLICATION CONTAINER

426 — DELETE, BY THE COMPUTER, USING THE SECONDARY APPLICATION CONTAINER CONTROLLER, THE ROUTER CONTAINER FROM THE POD IN RESPONSE TO DELETING THE SECONDARY APPLICATION CONTAINER FROM THE POD

428 — RECEIVE, BY THE COMPUTER, OTHER SUBSEQUENT EXTERNAL SERVICE REQUESTS FOR THE SERVICE PROVIDED BY THE PRIMARY APPLICATION CONTAINER AFTER THE HOT UPGRADE TO THE UPGRADED SECONDARY APPLICATION CONTAINER IS COMPLETE

430 — SEND, BY THE COMPUTER, THE OTHER SUBSEQUENT EXTERNAL SERVICE REQUESTS FOR THE SERVICE PROVIDED BY THE PRIMARY APPLICATION CONTAINER TO THE PORT THE UPGRADED SECONDARY APPLICATION CONTAINER IS NOW MONITORING TO MANAGE THE OTHER SUBSEQUENT EXTERNAL SERVICE REQUESTS FOR THE PRIMARY APPLICATION CONTAINER

420 — DIRECT, BY THE COMPUTER, USING THE SECONDARY APPLICATION CONTAINER CONTROLLER, THE ROUTER CONTAINER TO SEND THE SUBSEQUENT EXTERNAL SERVICE REQUEST TO THE SECONDARY APPLICATION CONTAINER TO MANAGE FOR THE PRIMARY APPLICATION CONTAINER

END

FIG. 4B

AUTOMATIC STATE MIGRATION OF STATEFUL CONTAINER DURING SECONDARY APPLICATION CONTAINER HOT UPGRADE

BACKGROUND

The disclosure relates generally to container orchestration architectures and more specifically to automatic state migration of stateful container during secondary application container hot upgrade in a container orchestration architecture.

A container orchestration architecture, such as, for example, Kubernetes® (a registered trademark of the Linux Foundation of San Francisco, California, USA), is used to deploy and manage containerized applications across host nodes on a cloud environment or within on-premises servers. A host node is a machine, either physical or virtual, where containers (i.e., application workload) are deployed.

The smallest deployable unit that can be created and managed in a container orchestration architecture is a pod. A pod encapsulates the containerized application. Typically, a single container is configured in a pod, but there are times when configuring multiple containers in a single pod is needed. This usually occurs when there are two or more containers tightly coupled to each other.

For example, a primary application container and a secondary application container (e.g., sidecar container) can exist in the same pod. The primary application container contains the application code or main business logic, while the secondary application container serves as a helper container that provides complementary functionality to support the services provided by the primary application container. The secondary application container runs in the same network as the primary application container, enabling the containers to communicate with each other. In addition, the two containers share resources, such as, for example, pod storage, network interfaces, and the like. For example, the secondary application container can share storage volumes with the primary application container, allowing the primary application container to access the data in the secondary application container. Further, the secondary application container can be developed in a different programming language than that of the primary application container, which provides increased flexibility for the services provided by the primary application container. In other words, the secondary application container can enhance and extend the functionalities of the primary application container without having to modify the application code in the primary application container when additional functionality that is handled more efficiently in another programming language is needed.

SUMMARY

According to one illustrative embodiment, a computer-implemented method for secondary application container hot upgrade is provided. A computer determines whether an upgraded secondary application container is ready to run in a pod that includes a secondary application container, a router container, and a primary application container based on monitoring a status of the upgraded secondary application container. The computer directs the router container to send a subsequent external service request to the upgraded secondary application container to manage for the primary application container in response to the computer determining that the upgraded secondary application container is ready to run in the pod based on monitoring the status of the upgraded secondary application container. The computer deletes the secondary application container from the pod that includes the upgraded secondary application container in response to the computer directing the router container to send the subsequent external service request to the upgraded secondary application container to manage for the primary application container. The computer deletes the router container from the pod in response to the computer deleting the secondary application container from the pod. According to other illustrative embodiments, a computer system and computer program product for secondary application container hot upgrade are provided.

BRIEF DESCRIPTION OF THE DRAWINGS

FIGS. 4A-4B are a flowchart illustrating a process for secondary application container hot upgrade while continuing to provide uninterrupted service by a corresponding primary application container in accordance with an illustrative embodiment.

DETAILED DESCRIPTION

Figure 1:
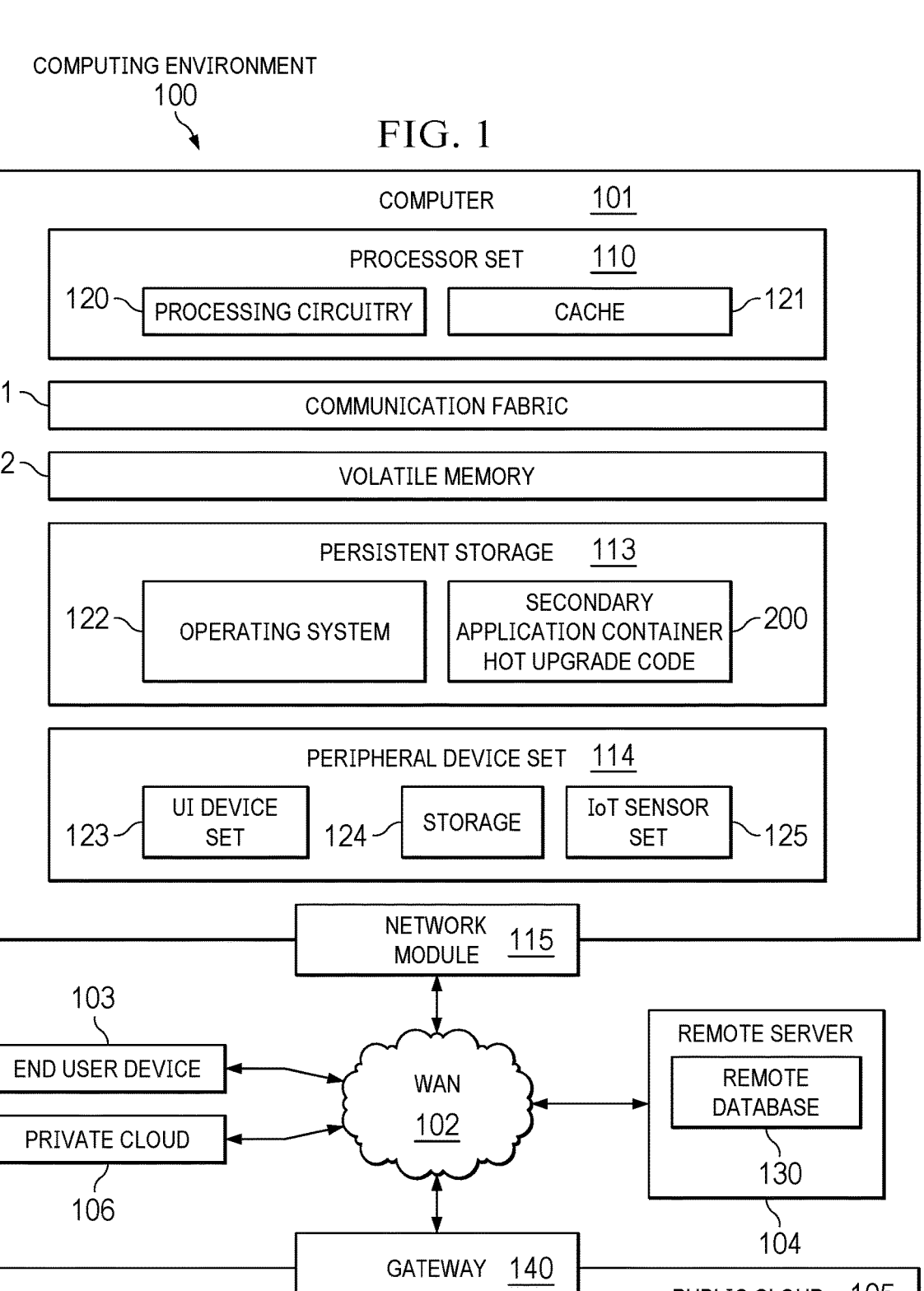
FIG. 1 is a pictorial representation of a computing environment in which illustrative embodiments may be implemented.

A computer-implemented method provides secondary application container hot upgrade. A computer determines whether an upgraded secondary application container is ready to run in a pod that includes a secondary application container, a router container, and a primary application container based on monitoring a status of the upgraded secondary application container. The computer directs the router container to send a subsequent external service request to the upgraded secondary application container to manage for the primary application container in response to the computer determining that the upgraded secondary application container is ready to run in the pod based on monitoring the status of the upgraded secondary application container. The computer deletes the secondary application container from the pod that includes the upgraded secondary application container in response to the computer directing the router container to send the subsequent external service request to the upgraded secondary application container to manage for the primary application container. The computer deletes the router container from the pod in response to the computer deleting the secondary application container from the pod. The upgraded secondary application container is a new version of the secondary application container. As a result, illustrative embodiments provide a technical effect of automatic secondary application container hot upgrade in the pod while continuing to provide uninterrupted service by the primary application container in the pod.

The computer also directs the router container to send the subsequent external service request to the secondary application container to manage for the primary application container in response to the computer determining that the upgraded secondary application container is not ready to run in the pod based on monitoring the status of the upgraded secondary application container. As a result, illustrative embodiments provide a technical effect of continuing to provide uninterrupted service by the primary application container in the pod even though the upgraded secondary application container is not ready to run in the pod.

The computer further receives other subsequent external service requests for a service provided by the primary application container after hot upgrade to the upgraded secondary application container is complete. The computer sends the other subsequent external service requests for the service provided by the primary application container to a port the upgraded secondary application container is now monitoring to manage the other subsequent external service requests for the primary application container. As a result, illustrative embodiments provide a technical effect of having the upgraded secondary application container manage other subsequent external service requests for the primary application container after hot upgrade.

Furthermore, the computer receives, from a user via a client device, an external service request for a service provided by the primary application container located in the pod of a host node corresponding to the computer prior to hot upgrade of the secondary application container located with the primary application container in the pod. The secondary application container manages external service requests corresponding to the primary application container. The computer sends the external service request for the service provided by the primary application container to a port that the secondary application container monitors to manage the external service request for the primary application container. As a result, illustrative embodiments provide a technical effect of having the secondary application container manage external service requests for the primary application container prior to hot upgrade of the secondary application container.

Moreover, the computer receives an input to perform hot upgrade of the secondary application container located with the primary application container in the pod. The computer, using a secondary application container controller, generates the router container and the upgraded secondary application container in the pod of a host node that already contains the secondary application container and the primary application container in response to performing the hot upgrade of the secondary application container. As a result, illustrative embodiments provide a technical effect of generating the router container and the upgraded secondary application container in the pod of the host node to perform the hot upgrade while continuing to provide uninterrupted service by the primary application container in the pod.

In addition, the computer directs the router container to monitor a port for external service requests corresponding to the primary application container. The computer also monitors the status of the upgraded secondary application container via a probe. The computer receives the subsequent external service request for a service provided by the primary application container during hot upgrade of the secondary application container to the upgraded secondary application container. The computer sends the subsequent external service request for the service provided by the primary application container to the port the router container is monitoring. As a result, illustrative embodiments provide a technical effect of having the router container monitor the port for external service requests instead of the secondary application container or the upgraded secondary application container during hot upgrade of the secondary application container to the upgraded secondary application container so that uninterrupted service can continue to be provided by the primary application container in the pod.

A computer system for secondary application container hot upgrade comprises a communication fabric, a storage device connected to the communication fabric, where the storage device stores program instructions, and a processor connected to the communication fabric, where the processor executes the program instructions. The computer system determines whether an upgraded secondary application container is ready to run in a pod that includes a secondary application container, a router container, and a primary application container based on monitoring a status of the upgraded secondary application container. The computer system directs the router container to send a subsequent external service request to the upgraded secondary application container to manage for the primary application container in response to the computer system determining that the upgraded secondary application container is ready to run in the pod based on monitoring the status of the upgraded secondary application container. The computer system deletes the secondary application container from the pod that includes the upgraded secondary application container in response to the computer system directing the router container to send the subsequent external service request to the upgraded secondary application container to manage for the primary application container. The computer system deletes the router container from the pod in response to the computer system deleting the secondary application container from the pod. The upgraded secondary application container is a new version of the secondary application container. As a result, illustrative embodiments provide a technical effect of automatic secondary application container hot upgrade in the pod while continuing to provide uninterrupted service by the primary application container in the pod.

The computer system also directs the router container to send the subsequent external service request to the secondary application container to manage for the primary application container in response to the computer system determining that the upgraded secondary application container is not ready to run in the pod based on monitoring the status of the upgraded secondary application container. As a result, illustrative embodiments provide a technical effect of continuing to provide uninterrupted service by the primary application container in the pod even though the upgraded secondary application container is not ready to run in the pod.

The computer system further receives other subsequent external service requests for a service provided by the primary application container after hot upgrade to the upgraded secondary application container is complete. The computer system sends the other subsequent external service requests for the service provided by the primary application container to a port the upgraded secondary application container is now monitoring to manage the other subsequent external service requests for the primary application container. As a result, illustrative embodiments provide a technical effect of having the upgraded secondary application container manage other subsequent external service requests for the primary application container after hot upgrade.

Furthermore, the computer system receives, from a user via a client device, an external service request for a service provided by the primary application container located in the pod of a host node corresponding to the computer prior to hot upgrade of the secondary application container located with the primary application container in the pod. The secondary application container manages external service requests corresponding to the primary application container. The computer system sends the external service request for the service provided by the primary application container to a port that the secondary application container monitors to manage the external service request for the primary application container. As a result, illustrative embodiments provide a technical effect of having the secondary application container manage external service requests for the primary application container prior to hot upgrade of the secondary application container.

Moreover, the computer system receives an input to perform hot upgrade of the secondary application container located with the primary application container in the pod. The computer system, using a secondary application container controller, generates the router container and the upgraded secondary application container in the pod of a host node that already contains the secondary application container and the primary application container in response to performing the hot upgrade of the secondary application container. As a result, illustrative embodiments provide a technical effect of generating the router container and the upgraded secondary application container in the pod of the host node to perform the hot upgrade while continuing to provide uninterrupted service by the primary application container in the pod.

A computer program product for secondary application container hot upgrade comprises a computer-readable storage medium having program instructions embodied therewith, the program instructions executable by a computer. The computer determines whether an upgraded secondary application container is ready to run in a pod that includes a secondary application container, a router container, and a primary application container based on monitoring a status of the upgraded secondary application container. The computer directs the router container to send a subsequent external service request to the upgraded secondary application container to manage for the primary application container in response to the computer determining that the upgraded secondary application container is ready to run in the pod based on monitoring the status of the upgraded secondary application container. The computer deletes the secondary application container from the pod that includes the upgraded secondary application container in response to the computer directing the router container to send the subsequent external service request to the upgraded secondary application container to manage for the primary application container. The computer deletes the router container from the pod in response to the computer deleting the secondary application container from the pod. The upgraded secondary application container is a new version of the secondary application container. As a result, illustrative embodiments provide a technical effect of automatic secondary application container hot upgrade in the pod while continuing to provide uninterrupted service by the primary application container in the pod.

The computer also directs the router container to send the subsequent external service request to the secondary application container to manage for the primary application container in response to the computer determining that the upgraded secondary application container is not ready to run in the pod based on monitoring the status of the upgraded secondary application container. As a result, illustrative embodiments provide a technical effect of continuing to provide uninterrupted service by the primary application container in the pod even though the upgraded secondary application container is not ready to run in the pod.

The computer further receives other subsequent external service requests for a service provided by the primary application container after hot upgrade to the upgraded secondary application container is complete. The computer sends the other subsequent external service requests for the service provided by the primary application container to a port the upgraded secondary application container is now monitoring to manage the other subsequent external service requests for the primary application container. As a result, illustrative embodiments provide a technical effect of having the upgraded secondary application container manage other subsequent external service requests for the primary application container after hot upgrade.

Furthermore, the computer receives, from a user via a client device, an external service request for a service provided by the primary application container located in the pod of a host node corresponding to the computer prior to hot upgrade of the secondary application container located with the primary application container in the pod. The secondary application container manages external service requests corresponding to the primary application container. The computer sends the external service request for the service provided by the primary application container to a port that the secondary application container monitors to manage the external service request for the primary application container. As a result, illustrative embodiments provide a technical effect of having the secondary application container manage external service requests for the primary application container prior to hot upgrade of the secondary application container.

Moreover, the computer receives an input to perform hot upgrade of the secondary application container located with the primary application container in the pod. The computer, using a secondary application container controller, generates the router container and the upgraded secondary application container in the pod of a host node that already contains the secondary application container and the primary application container in response to performing the hot upgrade of the secondary application container. As a result, illustrative embodiments provide a technical effect of generating the router container and the upgraded secondary application container in the pod of the host node to perform the hot upgrade while continuing to provide uninterrupted service by the primary application container in the pod.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable pro-grammable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electro-magnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
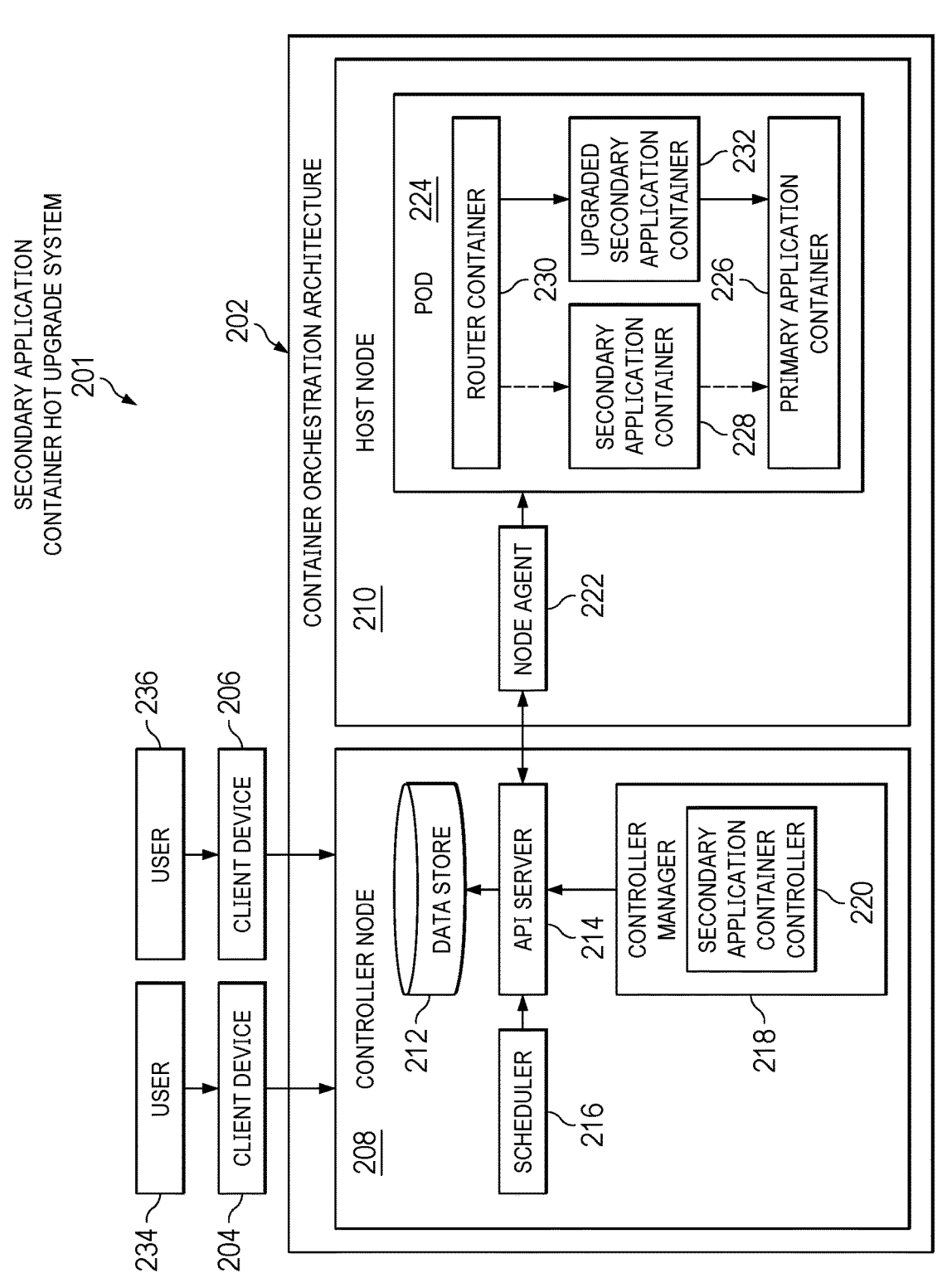
FIG. 2 is a diagram illustrating an example of a secondary application container hot upgrade system in accordance with an illustrative embodiment.

With reference now to the figures, and in particular, with reference to FIGS. 1-3, diagrams of data processing envi-ronments are provided in which illustrative embodiments may be implemented. It should be appreciated that FIGS. 1-3 are only meant as examples and are not intended to assert or imply any limitation with regard to the environ-ments in which different embodiments may be implemented. Many modifications to the depicted environments may be made.

FIG. 1 shows a pictorial representation of a computing environment in which illustrative embodiments may be implemented. Computing environment 100 contains an example of an environment, such as a container orchestra-tion environment, for the execution of at least some of the computer code involved in performing the inventive meth-ods of illustrative embodiments, such as secondary applica-tion container hot upgrade code 200. For example, second-ary application container hot upgrade code 200 provides full lifecycle management of secondary application containers during hot upgrade in pods of host nodes without interrupt-ing services provided by corresponding primary application containers in the pods. In other words, secondary application container hot upgrade code 200 ensures that the primary application container state is maintained during the second-ary application container hot upgrade process. For example, secondary application container hot upgrade code 200 gen-erates and adds a router container to the pod where the hot upgrade of the secondary application container is to occur. The router container manages the transition between the current secondary application container and an upgraded secondary application container (i.e., a new version of secondary application container) during the hot upgrade process to ensure uninterrupted service to users. For example, the router container directs external service requests to either the current secondary application container or the upgraded secondary application container during hot upgrade of the current secondary application container. After hot upgrade to the new version of secondary application container in the pod, secondary application container hot upgrade code 200 deletes both the old version of the secondary application container and the router container from the pod.

In addition to secondary application container hot upgrade code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and secondary application container hot upgrade code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orches-tration module 141, host physical machine set 142, virtual machine set 143, and container set 144.

Computer 101 may take the form of a mainframe com-puter, quantum computer, desktop computer, laptop com-puter, tablet computer, or any other form of computer now known or to be developed in the future that is capable of, for example, running a program, accessing a network, and querying a database, such as remote database 130. As is well understood in the art of computer technology, and depending upon the technology, performance of a computer-imple-mented method may be distributed among multiple comput-ers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer pro-cessors of any type now known or to be developed in the future. Processing circuitry 120 may be distributed over multiple packages, for example, multiple, coordinated inte-grated circuit chips. Processing circuitry 120 may imple-ment multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative prox-imity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth-ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in secondary appli-cation container hot upgrade code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a secondary application container image developer who utilizes the secondary application container hot upgrade services provided by computer 101), and may take any of the forms discussed above in connection with computer 101. EUD 103 typically receives helpful and useful data from the operations of computer 101. For example, in a hypothetical case where computer 101 is designed to provide a secondary application container upgrade recommendation to the end user, this recommendation would typically be communicated from network module 115 of computer 101 through WAN 102 to EUD 103. In this way, EUD 103 can display, or otherwise present, the secondary application container upgrade recommendation to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a secondary application container upgrade recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Runtime secondary application containers (e.g., sidecar containers, proxy containers, or the like) within pods manage all external requests for services provided by applications running in the primary application containers. As a result, when a runtime secondary application container is upgraded and restarted in a pod, then the availability of the service provided by the application running in the primary application container in that pod is affected (i.e., the service becomes unavailable for a time). Currently, complex secondary application container coordination and termination processes are needed when a runtime secondary application container is upgraded independently of the primary application container.

For example, an existing solution, OpenKruise, provides hot upgrade for stateful secondary application containers. However, a user (e.g., a secondary application container image developer) utilizing this existing solution needs to provide an empty container for the hot upgrade. The hot upgrade empty container image has the same configuration as the current secondary application container (e.g., command, lifecycle, probe, and the like), but the hot upgrade empty container is unable to do anything. Moreover, the user needs to provide a migration file or migration script to complete the state migration of the stateful secondary application container to the new version. Another issue with this existing solution is that during the state migration of the stateful secondary application container to the new version in the empty container, availability of the service provided by the primary application container is affected (i.e., the service is unavailable until the migration is completed).

In contrast, illustrative embodiments complete the state migration of the stateful secondary application container automatically during hot upgrade without affecting availability of the service provided by the primary application container in the pod (i.e., no service unavailability or down time). For example, prior to secondary application container hot upgrade in the pod, the current secondary application container listens to the port for external service requests received from client devices and manages the external service requests corresponding to the services provided by the application running in the primary application container. When the secondary application container hot upgrade process starts in response to receiving an upgrade command from the secondary application container image developer, a secondary application container controller of the controller manager, which is located in the controller node, generates two additional containers in the pod of the host node. The two additional containers that the secondary application container controller generates in the pod are a router container and an upgraded secondary application container. Illustrative embodiments utilize the router container to control the network traffic flow (i.e., external service requests) between the current secondary application container and the upgraded secondary application container. The upgraded secondary application container is a new version of the current secondary application container.

It should be noted that the secondary application container controller utilizes a probe to monitor the status of the upgraded secondary application container in the pod on a continuous basis or on a defined time interval basis. In response to the secondary application container controller determining that the upgraded secondary application container is not ready to run based on monitoring the status of the upgraded secondary application container, the secondary application container controller directs the router container to continue to send external service requests to the current secondary application container to manage for the corresponding primary application container. Conversely, in response to the secondary application container controller determining that the upgraded secondary application container is ready to run based on monitoring the status of the upgraded secondary application container, the secondary application container controller directs the router container to send subsequent external service requests to the upgraded secondary application container to manage for the corresponding primary application container. Additionally, after the secondary application container controller determines that the upgraded secondary application container is ready to run, the secondary application container controller deletes the current secondary application container from the pod. As a result, the current secondary application container drains and exits. Furthermore, in response to the secondary application container controller deleting the current secondary application container from the pod, the secondary application container controller also deletes the router container from the pod. After the secondary application container controller completes the hot upgrade to the upgraded secondary application container in the pod, the upgraded secondary application container now listens to the port for any subsequent external service requests and manages those requests corresponding to services provided by application running in the primary application container in the pod.

As a result, illustrative embodiments are able to complete state migration of stateful containers automatically during hot upgrade of secondary application containers without any service interruptions. Moreover, the secondary application container image developer does not need to consider the details of the hot upgrade (i.e., create an empty container or provide a migration file for the hot upgrade).

Thus, illustrative embodiments provide one or more technical solutions that overcome a technical problem with an inability of current solutions to perform hot upgrades of secondary application containers without service interruptions. As a result, these one or more technical solutions provide a technical effect and practical application in the field of container orchestration architectures.

With reference now to FIG. 2, a diagram illustrating an example of a secondary application container hot upgrade system is depicted in accordance with an illustrative embodiment. Secondary application container hot upgrade system 201 may be implemented in a computing environment, such as computing environment 100 in FIG. 1. Secondary application container hot upgrade system 201 is a system of hardware and software components for secondary application container hot upgrade in a pod of a host node while continuing to provide uninterrupted service by a corresponding primary application container in the pod. In this example, secondary application container hot upgrade system 201 includes container orchestration architecture 202, client device 204, and client device 206.

Container orchestration architecture 202 provides a platform for automating deployment, scaling, and operations of containers across host nodes. Container orchestration architecture 202 includes controller node 208. Controller node 208 is a main controlling unit of the host nodes (also known as worker nodes, compute nodes, minions, and the like) by, for example, managing the workload of the host nodes, directing communication across the host nodes, and the like. A host node, such as host node 210, is a machine, either physical or virtual, where a workload of a containerized application is deployed.

The control plane of the host nodes, which controller node 208 forms, consists of various components, such as data store 212, application programming interface (API) server 214, scheduler 216, and controller manager 218. Data store 212 contains configuration data of the host nodes, which represents the overall and desired state of the host nodes at any given time. API server 214 provides internal and external interfaces for controller node 208. API server 214 processes and validates resource availability requests and updates state of API objects in data store 212, thereby allowing users (e.g., tenants, clients, customers, or the like) to configure application workloads across the host nodes. Scheduler 216 selects which host node (e.g., host node 210) an unscheduled pod runs on based on resource availability of each respective host node. A pod, such as pod 224, is the basic unit managed by scheduler 216. Scheduler 216 tracks resource utilization on each respective host node to ensure that workload is not scheduled in excess of available resources. Controller manager 218 has a reconciliation loop that drives actual host node state toward the desired host node state, communicating with API server 214 to create, update, and delete the resources controller manager 218 manages (e.g., pods, service endpoints, and the like). If a host node's actual state does not match the desired state, then controller manager 218 takes action to fix the problem. Further, controller manager 218 includes secondary application container controller 220. Secondary application container controller 220 controls and manages the hot upgrade process of secondary application containers, such as secondary application container 228.

It should be noted that host node 210 can represent a plurality or cluster of host nodes. In this example, host node 210 includes node agent 222 and pod 224. Node agent 222 represents host node 210 to controller node 208 and manages containers on host node 210. Pod 224 includes primary application container 226 and secondary application container 228.

Primary application container 226 contains the main application code for the service provided by the application running in primary application container 226. Primary application container 226 can include, for example, code for an application server, a web server, a database server, or the like. Secondary application container 228 serves as a helper or support container that manages external requests for the services provided by the application running in primary application container 226.

In this example, user 234 sends the external requests for the services provided by the application running in primary application container 226 utilizing client device 204. However, it should be noted that user 234 and client device 204 can represent a plurality of different users and client devices. In addition, user 236 (e.g., a secondary application container image developer, system administrator, or the like), utilizing client device 206, sends a command to controller node 208 to upgrade secondary application container 228 to a new version while user 234 continues to send external service requests for the services provided by the application running in primary application container 226.

In response to receiving the command to upgrade secondary application container 228 to the new version, controller node 208 utilizes secondary application container controller 220 to generate router container 230 and upgraded secondary application container 232 in pod 224. Secondary application container controller 220 utilizes router container 230 to direct received external service requests either to secondary application container 228 or upgraded secondary application container 232 during the hot upgrade process to prevent interruption of the services provided by the application running in primary application container 226. Upgraded secondary application container 232 is the new version of secondary application container 228.

Secondary application container controller 220, utilizing, for example, a probe, monitors the status of upgraded secondary application container 232 to determine whether upgraded secondary application container 232 is up and running to manage the external services requests corresponding to primary application container 226. If secondary application container controller 220 determines that upgraded secondary application container 232 is not ready to manage the external service requests, then secondary application container controller 220 directs secondary application container 228 to continue to monitor the port for the external services requests corresponding to primary application container 226. If secondary application container controller 220 determines that upgraded secondary application container 232 is ready to manage the external service requests, then secondary application container controller 220 directs upgraded secondary application container 232 to monitor the port for subsequent external services requests corresponding to primary application container 226. After upgraded secondary application container 232 starts managing the subsequent external services requests for primary application container 226, secondary application container controller 220 deletes router container 230 and secondary application container 228 from pod 224.

Figure 3A:
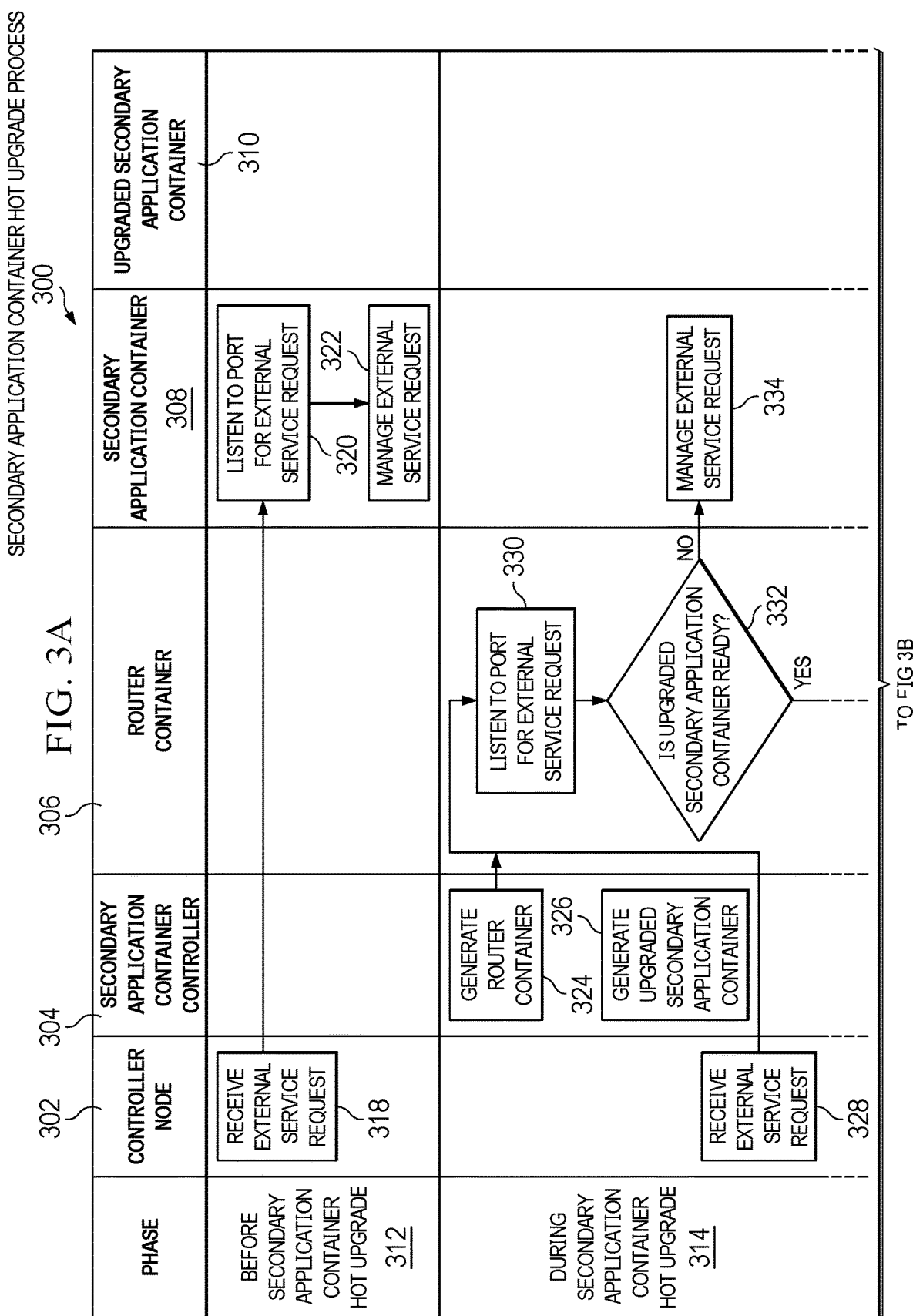
FIGS. 3A-3B are a diagram illustrating an example of a secondary application container hot upgrade process in accordance with an illustrative embodiment.
Figure 3B:
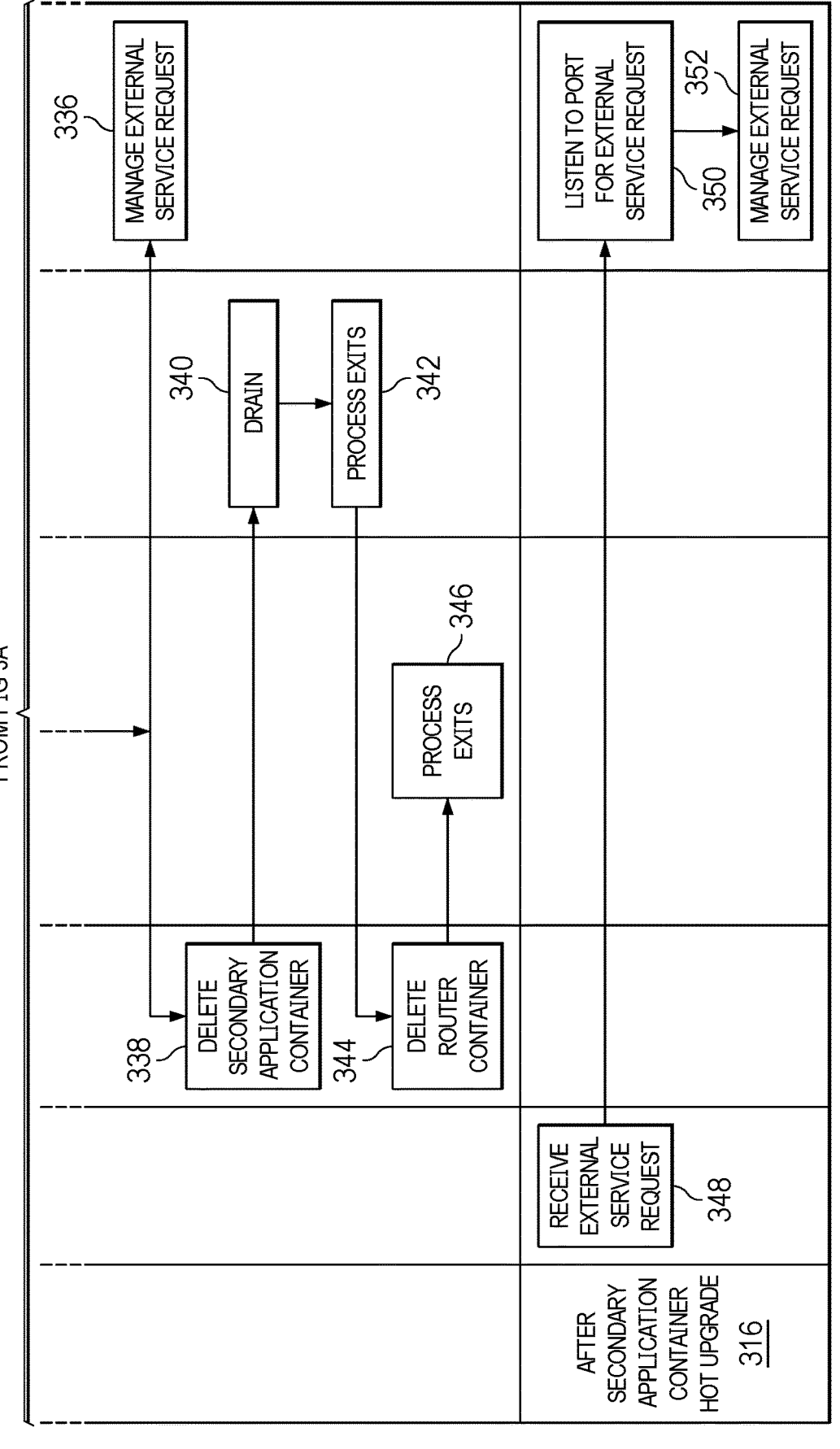

With reference now to FIGS. 3A-3B, a diagram illustrating an example of a secondary application container hot upgrade process is depicted in accordance with an illustrative embodiment. Secondary application container hot upgrade process 300 may be implemented in a computing environment, such as computing environment 100 in FIG. 1.

In this example, secondary application container hot upgrade process 300 includes controller node 302, secondary application container controller 304, router container 306, secondary application container 308, and upgraded secondary application container 310. Controller node 302, secondary application container controller 304, router container 306, secondary application container 308, and upgraded secondary application container 310 may be, for example, controller node 208, secondary application container controller 220, router container 230, secondary application container 228, and upgraded secondary application container 232 in FIG. 2. Secondary application container hot upgrade process 300 also includes phase 312, phase 314, and phase 316. Phase 312 represents a time period before secondary application container hot upgrade, phase 314 represents a time period during secondary application container hot upgrade, and phase 316 represents a time period after secondary application container hot upgrade.

In phase 312 before secondary application container hot upgrade, at 318, controller node 302 receives an external service request from a client device, such as, for example, client device 204 in FIG. 2, for services provided by an application running in a primary application container, such as, for example, primary application container 226 in FIG. 2, within a pod, such as, for example, pod 224 in FIG. 2, which also includes secondary application container 308. At 320, controller node 302 sends the external service request to the port that secondary application container 308 is listening to. At 322, in response to receiving the external service request via the port, secondary application container 308 manages the external service request for the primary application container.

In phase 314 during secondary application container hot upgrade, at 328, controller node 302 receives another external service request from a client device for services provided by the application running in the primary application container within the pod that includes secondary application container 308. At 324, controller node 302 directs secondary application container controller 304 to generate router container 306 in the pod that includes the primary application container and secondary application container 308. In addition, at 326, controller node 302 directs secondary application container controller 304 to generate upgraded secondary application container 310 in the same pod that includes the primary application container and secondary application container 308. At 330, controller node 302, utilizing secondary application container controller 304, directs router container 306 to listen to the port for the external service request. Further, controller node 302, utilizing secondary application container controller 304, monitors the status of upgraded secondary application container 310 to determine whether upgraded secondary application container 310 is ready to manage the external service request corresponding to the primary application container. At 322, based on the monitoring, controller node 302, utilizing secondary application container controller 304, determines whether upgraded secondary application container 310 is ready to run or not. At 334, if controller node 302, utilizing secondary application container controller 304, determines that upgraded secondary application container 310 is not ready to run, then controller node 302, utilizing secondary application container controller 304, directs router container 306 to send the external service request to secondary application container 308 to manage for the primary application container. Alternatively, at 336, if controller node 302, utilizing secondary application container controller 304, determines that upgraded secondary application container 310 is ready to run, then controller node 302, utilizing secondary application container controller 304, directs router container 306 to send the external service request to upgraded secondary application container 310 to manage for the primary application container. Furthermore, at 338, controller node 302, utilizing secondary application container controller 304, deletes secondary application container 308 from the pod. At 340, secondary application container 308 drains and the process exits at 342. Moreover, at 344, controller node 302, utilizing secondary application container controller 304, deletes router container 306 from the pod and the process exits at 346.

In phase 316 after secondary application container hot upgrade, at 348, controller node 302 receives another external service request from a client device for services provided by the application running in the primary application container within the pod, which now includes upgraded secondary application container 310. At 350, controller node 302 sends the external service request to the port that upgraded secondary application container 310 is now listening to. At 352, in response to receiving the external service request via the port, upgraded secondary application container 310 manages the external service request for the primary application container and any subsequent external service requests.

With reference now to FIGS. 4A-4B, a flowchart illustrating a process for secondary application container hot upgrade while continuing to provide uninterrupted service by a corresponding primary application container is shown in accordance with an illustrative embodiment. The process shown in FIGS. 4A-4B may be implemented in a computer, such as, for example, computer 101 in FIG. 1 or controller node 208 in FIG. 2. For example, the process shown in FIGS. 4A-4B may be implemented in secondary application container hot upgrade code 200 in FIG. 1.

The process begins when the computer receives, from a user via a client device, an external service request for a service provided by a primary application container located in a pod of a host node corresponding to the computer prior to hot upgrade of a secondary application container located with the primary application container in the pod (step 402). The secondary application container manages external service requests corresponding to the primary application container. The computer sends the external service request for the service provided by the primary application container to a port that the secondary application container monitors to manage the external service request for the primary application container (step 404).

Subsequently, the computer receives an input to perform the hot upgrade of the secondary application container located with the primary application container in the pod from a secondary application container image developer (step 406). The computer, using a secondary application container controller, generates a router container and an upgraded secondary application container in the pod of the host node that already contains the secondary application container and the primary application container in response to performing the hot upgrade of the secondary application container (step 408). The upgraded secondary application container is a new version of the secondary application container.

The computer, using the secondary application container controller, directs the router container to monitor the port for the external service requests corresponding to the primary application container (step 410). In addition, the computer, using the secondary application container controller, monitors a status of the upgraded secondary application container via a probe (step 412).

The computer receives a subsequent external service request for the service provided by the primary application container during the hot upgrade of the secondary application container to the upgraded secondary application container (step 414). The computer sends the subsequent external service request for the service provided by the primary application container to the port the router container is monitoring (step 416).

The computer, using the secondary application container controller, makes a determination as to whether the upgraded secondary application container is ready to run based on monitoring the status of the upgraded secondary application container via the probe (step 418). If the computer, using the secondary application container controller, determines that the upgraded secondary application container is not ready to run based on monitoring the status of the upgraded secondary application container via the probe, no output of step 418, then the computer, using the secondary application container controller, directs the router container to send the subsequent external service request to the secondary application container to manage for the primary application container (step 420). Thereafter, the process returns to step 412 where the computer, using the secondary application container controller, continues to monitor the status of the upgraded secondary application container.

Returning again to step 418, if the computer, using the secondary application container controller, determines that the upgraded secondary application container is ready to run based on monitoring the status of the upgraded secondary application container via the probe, yes output of step 418, then the computer, using the secondary application container controller, directs the router container to send the subsequent external service request to the upgraded secondary application container to manage for the primary application container (step 422). Further, the computer, using the secondary application container controller, deletes the secondary application container from the pod that includes the upgraded secondary application container in response to the computer directing the router container to send the subsequent external service request to the upgraded secondary application container to manage for the primary application container (step 424). Furthermore, the computer, using the secondary application container controller, deletes the router container from the pod in response to the computer deleting the secondary application container from the pod (step 426).

Subsequently, the computer receives other subsequent external service requests for the service provided by the primary application container after the hot upgrade to the upgraded secondary application container is complete (step 428). The computer sends the other external service requests for the service provided by the primary application container to the port the upgraded secondary application container is now monitoring to manage the other external service requests for the primary application container (step 430). Thereafter, the process terminates.

Thus, illustrative embodiments of the present disclosure provide a computer-implemented method, computer system, and computer program product for secondary application container hot upgrade in a pod while continuing to provide uninterrupted service by a corresponding primary application container in the pod. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for secondary application container hot upgrade, the computer-implemented method comprising:

determining, by a computer, whether an upgraded secondary application container is ready to run in a pod that includes a secondary application container, a router container created in the pod specifically for a hot-upgrade operation, and a primary application container based on monitoring a status of the upgraded secondary application container;

directing, by the computer, the router container to send a subsequent external service request to the upgraded secondary application container to manage for the primary application container in response to the computer determining that the upgraded secondary application container is ready to run in the pod based on monitoring the status of the upgraded secondary application container;

deleting, by the computer, the secondary application container from the pod that includes the upgraded secondary application container in response to the computer directing the router container to send the subsequent external service request to the upgraded secondary application container to manage for the primary application container; and deleting, by the computer, the router container after completion of the hot-upgrade operation and after deleting the secondary application container from the pod.

2. The computer-implemented method of claim 1, wherein the upgraded secondary application container is a new version of the secondary application container.

3. The computer-implemented method of claim 1, further comprising:

directing, by the computer, the router container to send the subsequent external service request to the secondary application container to manage for the primary application container in response to the computer determining that the upgraded secondary application container is not ready to run in the pod based on monitoring the status of the upgraded secondary application container.

4. The computer-implemented method of claim 1, further comprising:

receiving, by the computer, other subsequent external service requests for a service provided by the primary application container after hot upgrade to the upgraded secondary application container is complete; and sending, by the computer, the other subsequent external service requests for the service provided by the primary application container to a port the upgraded secondary application container is now monitoring to manage the other subsequent external service requests for the primary application container.

5. The computer-implemented method of claim 1, further comprising:

receiving, by the computer, from a user via a client device, an external service request for a service provided by the primary application container located in the pod of a host node corresponding to the computer prior to hot upgrade of the secondary application container located with the primary application container in the pod, wherein the secondary application container manages external service requests corresponding to the primary application container; and sending, by the computer, the external service request for the service provided by the primary application container to a port that the secondary application container monitors to manage the external service request for the primary application container.

6. The computer-implemented method of claim 1, further comprising:

receiving, by the computer, an input to perform hot upgrade of the secondary application container located with the primary application container in the pod; and generating, by the computer, using a secondary application container controller, the router container and the upgraded secondary application container in the pod of a host node that already contains the secondary application container and the primary application container in response to performing the hot upgrade of the secondary application container.

7. The computer-implemented method of claim 1, further comprising:

directing, by the computer, the router container to monitor a port for external service requests corresponding to the primary application container; and monitoring, by the computer, the status of the upgraded secondary application container via a probe.

8. The computer-implemented method of claim 7, further comprising:

receiving, by the computer, the subsequent external service request for a service provided by the primary application container during hot upgrade of the secondary application container to the upgraded secondary application container; and sending, by the computer, the subsequent external service request for the service provided by the primary application container to the port the router container is monitoring.

9. A computer system for secondary application container hot upgrade, the computer system comprising:

a communication fabric;

a storage device connected to the communication fabric, wherein the storage device stores program instructions; and a processor connected to the communication fabric, wherein the processor executes the program instructions to:

determine whether an upgraded secondary application container is ready to run in a pod that includes a secondary application container, a router container created in the pod specifically for a hot-upgrade operation, and a primary application container based on monitoring a status of the upgraded secondary application container;

direct the router container to send a subsequent external service request to the upgraded secondary application container to manage for the primary application container in response to determining that the upgraded secondary application container is ready to run in the pod based on monitoring the status of the upgraded secondary application container;

delete the secondary application container from the pod that includes the upgraded secondary application container in response to directing the router container to send the subsequent external service request to the upgraded secondary application container to manage for the primary application container; and delete the router container after completion of the hot-upgrade operation and after deleting the secondary application container from the pod.

10. The computer system of claim 9, wherein the upgraded secondary application container is a new version of the secondary application container.

11. The computer system of claim 9, wherein the processor further executes the program instructions to:

direct the router container to send the subsequent external service request to the secondary application container to manage for the primary application container in response to determining that the upgraded secondary application container is not ready to run in the pod based on monitoring the status of the upgraded secondary application container.

12. The computer system of claim 9, wherein the processor further executes the program instructions to:

receive other subsequent external service requests for a service provided by the primary application container after hot upgrade to the upgraded secondary application container is complete; and send the other subsequent external service requests for the service provided by the primary application container to a port the upgraded secondary application container is now monitoring to manage the other subsequent external service requests for the primary application container.

13. The computer system of claim 9, wherein the processor further executes the program instructions to:

receive, from a user via a client device, an external service request for a service provided by the primary application container located in the pod of a host node corresponding to the computer system prior to hot upgrade of the secondary application container located with the primary application container in the pod, wherein the secondary application container manages external service requests corresponding to the primary application container; and send the external service request for the service provided by the primary application container to a port that the secondary application container monitors to manage the external service request for the primary application container.

14. The computer system of claim 9, wherein the processor further executes the program instructions to:

receive an input to perform hot upgrade of the secondary application container located with the primary application container in the pod; and generate, using a secondary application container controller, the router container and the upgraded secondary application container in the pod of a host node that already contains the secondary application container and the primary application container in response to performing the hot upgrade of the secondary application container.

15. A computer program product for secondary application container hot upgrade, the computer program product comprising a computer-readable storage medium having program instructions embodied therewith, the program instructions executable by a computer to cause the computer to:

determine whether an upgraded secondary application container is ready to run in a pod that includes a secondary application container, a router container created in the pod specifically for a hot-upgrade operation, and a primary application container based on monitoring a status of the upgraded secondary application container;

direct the router container to send a subsequent external service request to the upgraded secondary application container to manage for the primary application container in response to determining that the upgraded secondary application container is ready to run in the pod based on monitoring the status of the upgraded secondary application container;

delete the secondary application container from the pod that includes the upgraded secondary application container in response to directing the router container to send the subsequent external service request to the upgraded secondary application container to manage for the primary application container; and delete the router container after completion of the hot-upgrade operation and after deleting the secondary application container from the pod.

16. The computer program product of claim 15, wherein the upgraded secondary application container is a new version of the secondary application container.

17. The computer program product of claim 15, wherein the program instructions further cause the computer to:

direct the router container to send the subsequent external service request to the secondary application container to manage for the primary application container in response to determining that the upgraded secondary application container is not ready to run in the pod based on monitoring the status of the upgraded secondary application container.

18. The computer program product of claim 15, wherein the program instructions further cause the computer to:

receive other subsequent external service requests for a service provided by the primary application container after hot upgrade to the upgraded secondary application container is complete; and send the other subsequent external service requests for the service provided by the primary application container to a port the upgraded secondary application container is now monitoring to manage the other subsequent external service requests for the primary application container.

19. The computer program product of claim 15, wherein the program instructions further cause the computer to:

receive, from a user via a client device, an external service request for a service provided by the primary application container located in the pod of a host node corresponding to the computer prior to hot upgrade of the secondary application container located with the primary application container in the pod, wherein the secondary application container manages external service requests corresponding to the primary application container; and send the external service request for the service provided by the primary application container to a port that the secondary application container monitors to manage the external service request for the primary application container.

20. The computer program product of claim 15, wherein the program instructions further cause the computer to:

receive an input to perform hot upgrade of the secondary application container located with the primary application container in the pod; and generate, using a secondary application container controller, the router container and the upgraded secondary application container in the pod of a host node that already contains the secondary application container and the primary application container in response to performing the hot upgrade of the secondary application container.

* * * * *